Jan. 19, 1965 T. L. WARDLAW 3,165,829
METHOD OF CLADDING ALUMINUM WITH TITANIUM
Filed Jan. 29, 1962
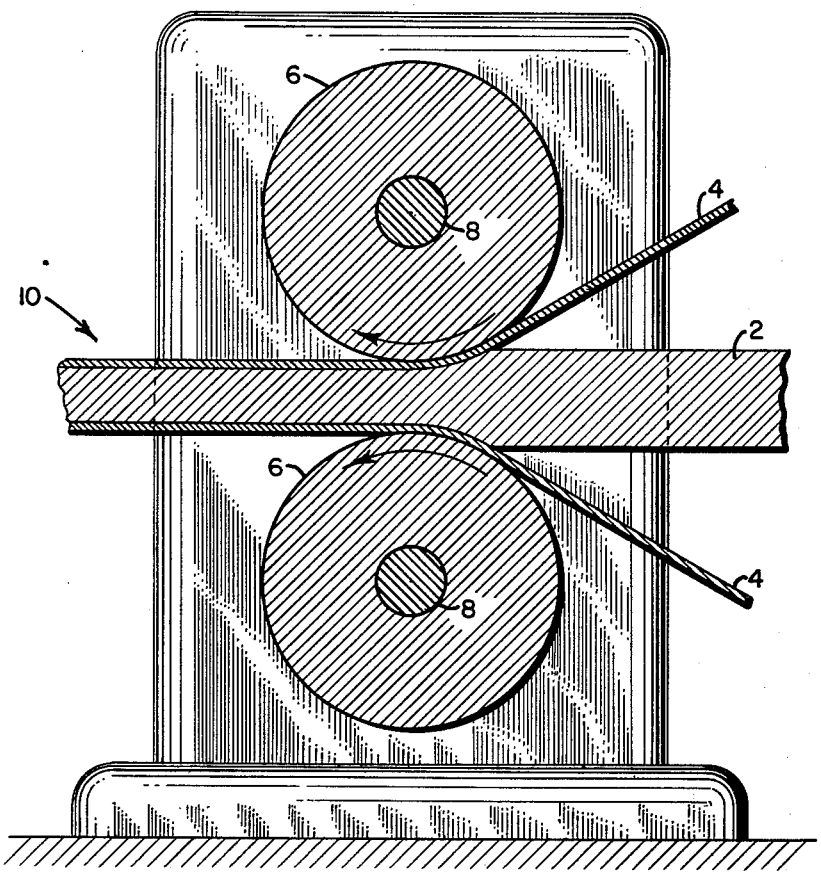
INVENTOR.
Tommie L. Wardlaw
BY
Agent 3,165,829
METHOD OF CLADDING ALUMINUM WITH TITANIUM
Tommie L. Wardlaw, Henderson, Nev., assignor to Titanium Metals Corporation of America, New York, N.Y., a corporation of Delaware
Filed Jan. 29, 1962, Ser. No. 169,315
5 Claims. (Cl. 29—497)

This invention relates to a method of forming a composite product having an aluminum core clad with a strongly bonded outer layer of titanium.

Metal products clad with titanium have been considered desirable because an outer surface of titanium can impart a surface layer having the advantageous strength and corrosion resistance of titanium to a core of more common and less expensive metal. Attempts have been made heretofore to produce such clad products by hot rolling a composite of the titanium outer layer and the core metal. However, the tendency of a titanium surface to oxidize at the elevated temperatures necessary for efficient rolling has interfered with obtaining an effective bond between the titanium and the core metal. Cold-rolling of a multi-layer composite has been proposed but this requires much greater power to produce acquired reduction in over-all thickness and unless an extremely pure and expensive grade of titanium is employed, the titanium outer layer or layers tend to break and split apart under the heavy rolling pressures as described in the U.S. Patent No. 2,993,260. Rolling a multi-layer composite in the form of a pack enclosed in a gas tight metal envelope which is evacuated or filled with an inert gas has been proposed, but this has not apparently produced consistently good bonding.

It is therefore an object of this invention to provide an improved method of producing a composite product having an aluminum core clad with a strongly bonded outer layer of titanium. Another object of this invention is to provide a simple and economical method of producing a composite product having an aluminum core clad with a strongly bonded outer layer of titanium. Another object of this invention is to provide a method for producing a composite product having an aluminum core clad on both face surfaces with a strongly bonded outer layer of titanium. These and other objects of this invention will be apparent from the following description thereof and from the annexed drawing, the single figure of which illustrates the method of producing a product according to this invention.

In its broad aspects this invention contemplates conjoint rolling of a core composed of a body of aluminum heated to between 700° F. and 1050° F, and an outer layer composed of titanium sheet which is cold, that is, at ambient or normal room temperature. The rolling mill is adjusted and the rolling operation carried out to produce a reduction in thickness of the aluminum core of between 30% and 80% in one pass through the rolls. It is necessary, to prevent undue heat transfer between the hot aluminum core slab and the cold titanium sheet, that the rolling be conducted immediately after the titanium sheet and the hot aluminum core body are placed in face to face contact with each other. The aluminum core being hot, readily plastically deforms when rolled but the titanium, being cold, does not, and under these conditions during the rolling operation a strong bond is formed between the aluminum core and the titanium outer layer. The titanium layer may be applied to either face surface of the aluminum, or both.

Referring now to the single figure of the drawing, a rolling mill stand is pictured provided with a pair of rolls 6 which are revolved in the directions shown by the arrows around their respective axles 8. Fed between the rolls 6 is an aluminum core slab 2 which has been heated to rolling temperature. On either side of aluminum slab 2 are titanium sheets 4 which are maintained apart until they are jointly fed and passed between the rolls 6 substantially as shown, to produce the product indicated at 10 which has the aluminum core clad with outer layers of titanium strongly bonded to both face surfaces.

As used herein, the term "aluminum" is intended to include pure aluminum as commercially manufactured and sold as well as various alloys of which aluminum is the base metal or major constituent. The aluminum may be in the form of a thick sheet, strip, plate or slab and will most often be of greater thickness than the titanium. The term "titanium" as used herein, is intended to include commercially pure titanium as manufactured and sold, as well as various alloys of which titanium is the base metal or constitutes the major part. Both the aluminum and titanium employed in the method of this invention are of ordinary commercial grades. No special purity requirements or ductility characteristics are necessary for obtaining the superior bonding characteristics obtained by the method herein described. The titanium may be in the form of a sheet, strip or plate and most often of thickness less than the aluminum core. For convenience it will be referred to as a sheet.

The degree of reduction of the aluminum core is critical. Good bonding between it and the titanium outer layer or layers has not been possible when the degree of reduction has been less than about 30%. If the degree of reduction is over 80%, the titanium outer layer will break and split forming an alligator skin appearance on the surface of the composite product. Such formation destroys the integrity of the titanium layer as will be apparent. The higher degrees of reduction, that is, between 65% and 80%, can be successfully employed in small equipment and with careful control, however, for large scale operations the practical upper limit is 65% reduction. The degree of reduction is expressed as that percentage of its original thickness characterizing the core slab after rolling conjointly with the titanium; thus an aluminum core one inch thick rolled to ½ inch thickness would be reduced 50%.

When the aluminum core is thus reduced, according to this invention, it increases correspondingly in length. It is postulated that the length increase and plastic deformation produces a wiping action between the aluminum and titanium surfaces which breaks up and displaces any oxide film and promotes formation of a strong bond. If the degree or reduction of the core is less than about 30% apparently the wiping and cleaning action imparted by the comparatively small amount of elongation is not sufficient to promote the desired bonding effect.

In the case of reduction of over about 80% the wiping and bonding effect is obtained to a high degree but the excessive elongation of the core slab, combined with the excellent bonding, tends to pull the titanium apart, especially if the titanium is thin or of a relatively low strength composition.

The titanium outer layer material is to be maintained cold, that is, at ambient or normal room temperature, until just prior to rolling onto the aluminum core. It is not heated except as it may incidentally pick up heat from the hot aluminum core body, and for best results this should be kept to a minimum. Therefore, it is necessary that the titanium and aluminum core must be rolled immediately after they are placed together in contact with one another. If production of the composite product is continuous as on a so-called strip mill, the aluminum core body may be a continuous length from a coil (being appropriately heated as described) while the titanium outer layer or layers may also be in the coil form with the strip or strips entering the nip of the rolls together with the aluminum core at an angle as illustrated in FIG. 1.

It is necessary that the aluminum core material be heated for rolling to a temperature at which plastic deformation can readily be obtained. This temperature should be between 700° F. and 1050° F. and preferably between 950° F. and 1000° F. It has been found that temperatures lower than about 700° F. do not provide good bonding effect; temperatures above 1050° F. should not be employed because such temperature may approach too closely the melting point of aluminum at 1220° F. The optimum combination of good plastic deformation, promotion of bonding and with a safe margin below the melting point of aluminum occurs within the preferred range of 950° F. to 1000° F.

Generally speaking, the higher the aluminum temperature and the greater the degree of its reduction, the better the bonding effect subject to upper limits as defined above.

The surfaces to be mated of both the titanium and aluminum must be scrupulously clean before conjoint rolling to promote direct contact between the titanium and aluminum surfaces. This may be accomplished by known cleaning methods including degreasing (if necessary) by treatment with a conventional solvent, sand blasting or wire brushing to remove oxide or scale, and conventional alkali treatment and acid pickling, to produce a bright, clean surface. A suitable alkali bath contains 50% KOH, balance water. An acid bath suitable for pickling contains 8% $HNO_3$, 1% HF, balance water. It will be understood that other equivalent or alternative treatments or pickling bath compositions may be employed when necessary or desirable to effect the required cleanliness of titanium and aluminum surfaces.

It will be found advantageous when starting the composite pack through the rolls to have the titanium formed over the leading edge of the aluminum core body. When composite products are produced on a hand mill a titanium sheet of suitable length can be bent transversely across its center over a suitable brake to form a horizontal shallow V-shaped organization. A hot aluminum slab is then placed inside the V with its end snug against the inside nook of the V. The apex of the V is then immediately inserted between the rolls and it will be found the rolls will grip the titanium and core body together and pull the composite through conjointly. A similar effect can be obtained by welding the edges of a pair of titanium outside layer sheets to form a similar organization. Employment of the flat V form to the titanium outer layer sheets makes possible the separation of the titanium and aluminum until they are nipped together by the rolls. Such a condition either when using a sheet mill or a continuous strip mill produces the best maintenance of desired titanium temperature. However, good results can be obtained if the titanium outer layer or layers are laid on the hot aluminum and the composite is rolled conjointly providing the rolling immediately follows such placing in contact of the surfaces of the composite elements so that no more than incidental heating of the titanium occurs. If desired, steel cover sheets may be employed over the titanium outer layer as is sometimes practiced when rolling certain metals. The cover sheets protect the rolls and may improve the surface finish of the titanium outer layer.

After the initial rolling the bond between the titanium and the aluminum can be improved somewhat by reheating the rolled product to between 900° F. and 1050° F. and re-rolling to produce by the re-rolling pass a further reduction of from up to 15% of the aluminum core thickness (that is, up to 15% of the core thickness after the initial rolling).

A stress relief or anneal may be employed after rolling if desired, and the composite product may be heated to between 900° F. and 1000° F. for a period up to about 2 hours. Longer anneal periods appear to produce no additional benefit.

The bonding between the titanium and aluminum core may be tested by taking a specimen of the composite product ⅝ inch in width and 2⅛ inches long and twisting this 360 degrees around its longitudinal axis and then twisting it back 360 degrees so that a complete reversal of stress occurs. Any separation of the individual layers during this test indicates inferior bonding, while it will be appreciated that maintenance of the integrity of the composite product through this very severe test will indicate excellent adhesion and bonding of the layers. An additional test is to break a tensile specimen of the product and to note the degree of separation of the titanium and the aluminum core in the fractured ends of the specimen.

Any tendency for the titanium outer layer to split or alligator will be evident by examination under a low power microscope, and when the effect is severe it will be apparent to the naked eye.

The following examples illustrate selected embodiments of the practice of this invention.

*Example 1*

A plate 0.250 inch thick and 16½ inches by 17½ inches of aluminum (commercially pure, grade 2S) was cleaned by wire brushing and pickling in an aqueous solution of 8% $HNO_3$ and 1% HF.

A sheet of titanium (commercially pure, grade 55A) 0.020 inch thick and 17½ inches by 48 inches long, was cleaned by pickling in an aqueous solution of 8% $HNO_3$ and 1% HF. The titanium sheet was then folded transversely across the middle of its length around an 0.250 inch diameter rod, to form a flat V double layer.

The aluminum plate was heated to 975° F. in a furnace.

A folded steel cover sheet was placed outside the titanium folded sheet to protect the rolls of the mill.

The aluminum plate was removed hot from the furnace and one end quickly placed in the nook of the V in the folded titanium sheet and the composite assembly, that is, hot aluminum plate, folded titanium sheet at room temperature and a steel cover sheet was immediately rolled through a two high rolling mill having 29 inch diameter rolls, rotated at 32 r.p.m. The roll setting had previously been adjusted to produce a reduction of about 35% in the thickness of the aluminum plate core, in one pass. The composite pack rolled easily through the mill. The steel cover sheet was then removed and the composite product was found to comprise the aluminum as a core clad with a firmly bonded titanium layer on top and bottom surfaces. Examination of the product showed that the aluminum core thickness had been reduced from 0.250 inch to 0.132 inch representing a reduction of 34.4%. No cracking of the titanium outer layers was found. A section, ⅝ inch by 2⅛ inch cut from the product, was twisted around its longitudinal axis 360 degrees and then 360 degrees back in the reverse direction and no separation of the core and titanium outer layers occurred.

*Example 2*

The same titanium and aluminum materials were used as in Example 1 except that the titanium was cleaned by wire brushing as well as pickling.

The aluminum plate was heated to 975° F. and then placed while hot in the cold folded titanium outer layers and steel cover sheets and immediately rolled through the same mill. The rolls had previously been adjusted to produce a reduction of about 48% in the aluminum core thickness. Actually the reduction obtained was 47.2% and the same strong bond was obtained between the titanium outer layers and the aluminum core as demonstrated by the twist and reverse twist test.

*Example 3*

A section of the composite product produced in Example 1 was heated to 975° F. for about 1 hour and then re-rolled with one pass through the same rolling mill to produce a further reduction of 2% in the aluminum core thickness. The bond was improved slightly as shown by tensile tests pulled a specimen cut from the composite before and after re-rolling. The fracture zone when the specimens were broken showed slightly less separation of the titanium layers.

The product of this invention, having a titanium cladding firmly bonded to the aluminum core, may be bent, spun or otherwise formed into a variety of shapes for further fabrication. A substantial degree of deformation may be employed in such forming operations without causing separation of the cladding from the core.

The product is of light weight, imparted by the aluminum core, and its clad surface has the corrosion resistance and strength properties of titanium and it is useful where these properties are advantageous. Additionally, it is characterized by high buckling strength making it useful in applications where strength, lightness and rigidity are required such as certain components of aircraft and missiles.

I claim:
1. A method of producing a product having an aluminum core clad with a strongly bonded outer layer of titanium which comprises:
   (a) heating a core body of aluminum to a temperature between 700° F. and 1050° F.;
   (b) placing a sheet of titanium at ambient temperature in direct face-to-face contact with said heated core body of aluminum; and,
   (c) immediately passing said sheet of titanium and said aluminum core body conjointly through a rolling mill to obtain a reduction in thickness of said core body of aluminum of between 30% and 80% in one pass without deforming said sheet of titanium.

2. A method of producing a product having an aluminum core clad with a strongly bonded outer layer of titanium which comprises:
   (a) heating a core body of aluminum to a temperature between 700° F. and 1050° F.;
   (b) placing a sheet of titanium at ambient temperature in direct face-to-face contact with said heated core body of aluminum; and,
   (c) immediately passing said sheet of titanium and said aluminum core body conjointly through a rolling mill to obtain a reduction in thickness of said core body of aluminum between 30% and 65% in one pass without deforming said sheet of titanium.

3. A method of producing a product having an aluminum core clad with a strongly bonded outer layer of titanium which comprises:
   (a) heating a core body of aluminum to a temperature between 950° F. and 1000° F.;
   (b) placing a sheet of titanium at ambient temperature in direct face-to-face contact with said heated core body of aluminum; and,
   (c) immediately passing said sheet of titanium and said aluminum core body conjointly through a rolling mill to obtain a reduction in thickness of said core body of aluminum of between 30% and 65% in one pass without deforming said sheet of titanium.

4. A method of producing a product having an aluminum core clad with a strongly bonded outer layer of titanium which comprises:
   (a) heating a core body of aluminum to a temperature between 700° F. and 1050° F.;
   (b) placing a sheet of titanium at ambient temperature in direct face-to-face contact with said heated core body of aluminum;
   (c) immediately passing said sheet of titanium and said aluminum core body conjointly through a rolling mill to obtain a reduction in thickness of said core body of aluminum of between 30% and 65% in one pass without deforming said sheet of titanium;
   (d) heating the product of step (c) to 900° F. to 1050° F.; and
   (e) rolling said heated product to produce a reduction of up to 15% of the thickness of its aluminum core.

5. A method of producing a product having an aluminum core clad with a strongly bonded outer layer of titanium which comprises:
   (a) heating a core body of aluminum to a temperature between 700° F. and 1050° F.;
   (b) placing a sheet of titanium at ambient temperature in direct face-to-face contact with said heated core body of aluminum at one end only of said heated core body of aluminum, and
   (c) inserting said one end of said heated core body of aluminum and said sheet of titanium in face-to-face contact between the rolls of a rolling mill and passing said heated core body of aluminum and said titanium sheet conjointly through said rolling mill to obtain a reduction in thickness of said core body of aluminum of between 30% and 80% in one pass without deforming said sheet of titanium, while maintaining said heated aluminum core body and said sheet of titanium spaced apart until they meet in face-to-face contact on entering between the rolls of said rolling mill.

References Cited in the file of this patent

UNITED STATES PATENTS

| | | |
|---|---|---|
| 1,033,412 | Jordan | July 23, 1912 |
| 1,979,539 | Gardner et al. | Nov. 6, 1934 |
| 2,786,265 | Keay | Mar. 26, 1957 |
| 2,879,587 | Mushovic et al. | Mar. 31, 1959 |
| 2,908,073 | Dulin | Oct. 13, 1959 |

FOREIGN PATENTS

| | | |
|---|---|---|
| 793,364 | Great Britain | Apr. 16, 1958 |